(12) United States Patent
Kihara et al.

(10) Patent No.: US 12,301,770 B2
(45) Date of Patent: May 13, 2025

(54) INFORMATION PROCESSING APPARATUS, ABNORMALITY DETECTION METHOD, STORAGE MEDIUM, AND INFORMATION PROCESSING SYSTEM

(71) Applicants: Hideyuki Kihara, Kanagawa (JP); Yusuke Taneda, Kanagawa (JP); Yuta Nagata, Kanagawa (JP)

(72) Inventors: Hideyuki Kihara, Kanagawa (JP); Yusuke Taneda, Kanagawa (JP); Yuta Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/177,886

(22) Filed: Mar. 3, 2023

(65) Prior Publication Data

US 2023/0291842 A1    Sep. 14, 2023

(30) Foreign Application Priority Data

Mar. 8, 2022  (JP) ................................ 2022-035013
Nov. 30, 2022 (JP) ................................ 2022-192479

(51) Int. Cl.
*H04N 1/00* (2006.01)
*H04N 1/60* (2006.01)

(52) U.S. Cl.
CPC ..... *H04N 1/00037* (2013.01); *H04N 1/00013* (2013.01); *H04N 1/6044* (2013.01)

(58) Field of Classification Search
CPC ........... H04N 1/00037; H04N 1/00013; H04N 1/6044
USPC ....................................... 358/1.14, 1.15, 1.9
See application file for complete search history.

(56) References Cited

U.S. PATENT DOCUMENTS

| | | | |
|---|---|---|---|
| 8,801,141 B2 | 8/2014 | Eiyama | |
| 8,989,605 B2 | 3/2015 | Ino | |
| 2008/0137154 A1* | 6/2008 | Nakaya | H04N 1/60 358/474 |
| 2011/0096375 A1* | 4/2011 | Mikami | H04N 1/00031 358/475 |
| 2013/0222858 A1 | 8/2013 | Yokoyama | |
| 2013/0250378 A1 | 9/2013 | Kitai et al. | |

(Continued)

FOREIGN PATENT DOCUMENTS

| | | |
|---|---|---|
| EP | 3712705 A1 | 9/2020 |
| JP | 2011-196717 | 10/2011 |

(Continued)

OTHER PUBLICATIONS

Extended European Search Report, dated Jun. 29, 2023, issued in corresponding European Patent Application No. 23160333.3.

*Primary Examiner* — Quang N Vo
(74) *Attorney, Agent, or Firm* — Harness, Dickey & Pierce, P.L.C.

(57) ABSTRACT

An information processing apparatus includes processing circuitry. The processing circuitry detects an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance, and identifies a cause of an abnormality in the image reading apparatus in a case where the processing circuitry detects the abnormality.

17 Claims, 13 Drawing Sheets

(56) References Cited

U.S. PATENT DOCUMENTS

| | | |
|---|---|---|
| 2018/0259394 A1 | 9/2018 | Gotoh et al. |
| 2018/0350059 A1 | 12/2018 | Watanabe et al. |
| 2019/0230254 A1 | 7/2019 | Taneda et al. |
| 2019/0250040 A1 | 8/2019 | Taneda et al. |
| 2020/0007694 A1 | 1/2020 | Kubota et al. |
| 2020/0018650 A1 | 1/2020 | Sone et al. |
| 2020/0300701 A1 | 9/2020 | Taneda et al. |
| 2021/0377396 A1* | 12/2021 | Inukai .................. H04N 1/4097 |

FOREIGN PATENT DOCUMENTS

| | | |
|---|---|---|
| JP | 2013-225839 | 10/2013 |
| JP | 2017-067452 | 4/2017 |

* cited by examiner

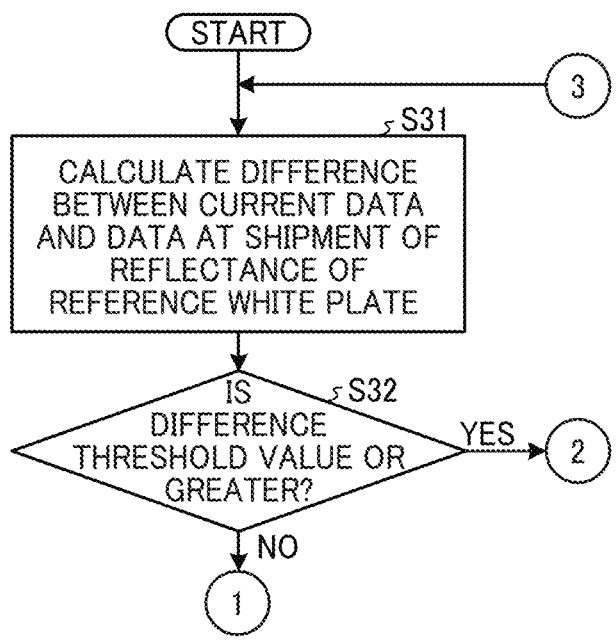

REFERENCE WHITE PLATE, REDUCTION IMAGING LENS, AND LINE SENSOR MAY BE DIRTY.
HAVE THOSE COMPONENTS BEEN CLEANED?

YES    NO

INFORMATION PROCESSING APPARATUS, ABNORMALITY DETECTION METHOD, STORAGE MEDIUM, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application Nos. 2022-035013, filed on Mar. 8, 2022, and 2022-192479, filed on Nov. 30, 2022, in the Japan Patent Office, the entire disclosure of each of which is hereby incorporated by reference herein.

BACKGROUND

Technical Field

Embodiments of the present disclosure relate to an information processing apparatus, an abnormality detection method, a storage medium, and an information processing system.

Related Art

In order to maintain the quality of printed matter, for example, a reading apparatus reads a predetermined color chart that has been printed, to perform color adjustment in an image forming apparatus.

In addition, a technique is disclosed in which a check chart containing color patches printed for checking colors after color adjustment is read by a colorimetry apparatus as an image reading apparatus to check whether the print quality of an image forming apparatus satisfies a standard. However, when the state of the image reading apparatus that reads an image such as a color chart is not appropriate, the print quality of the image forming apparatus cannot be correctly evaluated.

For example, a technique is known that detects an abnormality in a spectrophotometric colorimeter on the basis of information on measurement of a measurement target sheet performed by the spectrophotometric colorimeter, for the purpose of detecting an abnormality in the spectrophotometric colorimeter as an image reading apparatus.

SUMMARY

According to an embodiment of the present disclosure, an information processing apparatus includes processing circuitry. The processing circuitry detects an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance, and identifies a cause of an abnormality in the image reading apparatus in a case where the processing circuitry detects the abnormality.

According to another embodiment of the present disclosure, an information processing system includes an image reading apparatus to read a reference white plate; and the information processing apparatus.

According to still another embodiment of the present disclosure, there is provided an abnormality detection method to be executed in an information processing apparatus. The abnormality detection method includes detecting and identifying. The detecting detects an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance. The identifying identifies a cause of an abnormality in the image reading apparatus in a case where the abnormality is detected by the detecting.

According to still yet another embodiment of the present disclosure, a non-transitory storage medium sores computer-readable code which, when executed by one or more processors, cause an information processing apparatus to perform detecting and identifying. The detecting detects an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance. The identifying identifies a cause of an abnormality in the image reading apparatus in a case where the abnormality is detected by the detecting.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 10 including FIGS. 10A and 10B is a flowchart illustrating a flow of abnormality determination processing;

Figure 1:
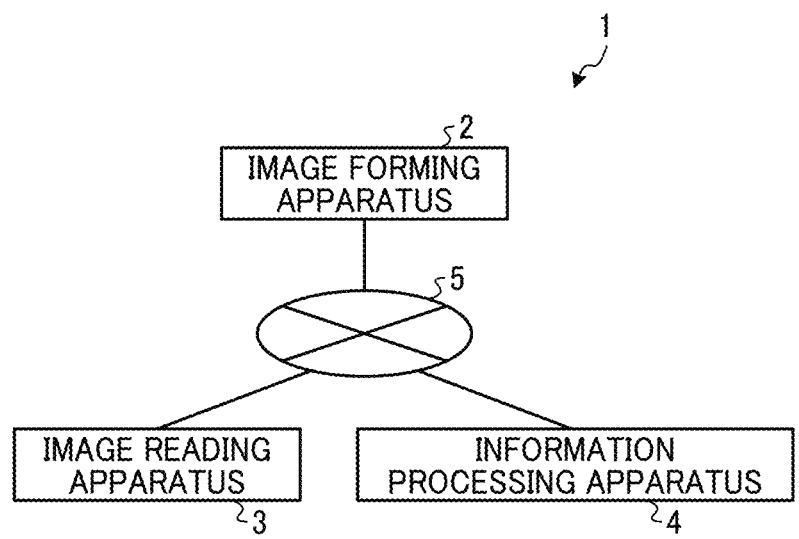
FIG. 1 is a diagram illustrating a configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an embodiment of an information processing apparatus, a program, an abnormality detection method, and an information processing system will be described in detail with reference to the accompanying drawings.

FIG. 1 is a diagram illustrating a configuration of an information processing system 1 according to the embodiment. As illustrated in FIG. 1, the information processing system 1 includes an image forming apparatus 2, an image reading apparatus 3, and an information processing apparatus 4 that are connected via a network 5. The image forming apparatus 2 is an inkjet image forming apparatus. The information processing apparatus 4 is a personal computer (PC) for use in quality evaluation and management.

The information processing apparatus 4 can issue an operation instruction to the image forming apparatus 2 and the image reading apparatus 3 and transmit/receive data to/from the image forming apparatus 2 and the image reading apparatus 3 via the network 5.

The image reading apparatus 3 is an example of applying a spectral characteristic acquisition apparatus that reads predetermined image data (quality evaluation chart) having been printed and performs color adjustment, so as to maintain the quality of printed matter produced by the image forming apparatus 2. Note that the image reading apparatus 3 is not limited to the spectral characteristic acquisition apparatus, and refers to all apparatuses that can acquire electronic data on the chart, including an image scanner and a colorimeter.

First, the image reading apparatus 3 which is a spectral characteristic acquisition apparatus will be described.

Note that an image bearing medium such as a sheet is cited as an example of an object for which spectral characteristics are acquired in the description of the embodiment, where the object for which spectral characteristics are acquired is simply referred to as a sheet. Directions are indicated by solid arrows in some of the drawings, where an X-axis direction is defined as a width direction of a sheet, a Y-axis direction is defined as a direction in which the sheet is conveyed, and a Z-axis direction is defined as a direction orthogonal to an XY-plane. Note that the X-axis direction is an example of a "direction intersecting a predetermined conveyance direction", and the Y-axis direction is an example of the "predetermined conveyance direction".

Figure 2:
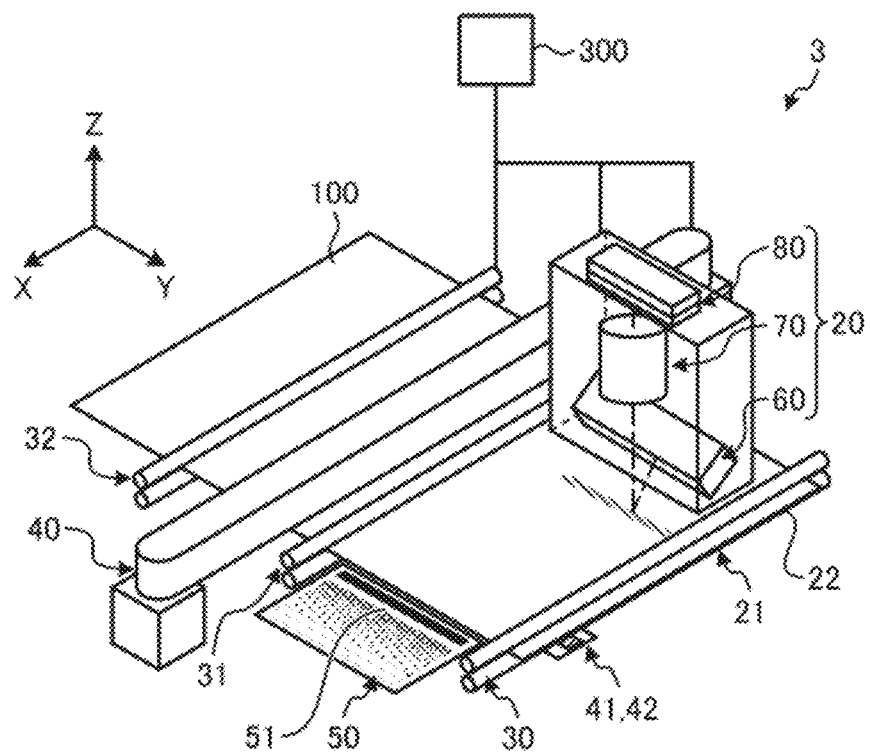
FIG. 2 is a perspective view of an image reading apparatus according to an embodiment of the present disclosure, in which a configuration of the image reading apparatus is illustrated.

FIG. 2 is a perspective view of the image reading apparatus 3, in which a configuration of the image reading apparatus 3 is illustrated. In FIG. 2, the image reading apparatus 3 includes a color data acquisition unit 20, sheet conveyors 30, 31, and 32, sheet detection sensors 41 and 42, a color data acquisition unit conveyor 40, a calibration color chart 50, and a controller 300.

In addition, the color data acquisition unit 20 includes a line illumination light source 60, a reduction imaging lens 70, and a spectroscopic unit 80. The color data acquisition unit 20 is an example of a "color data acquisition unit". Furthermore, the sheet conveyors 30, 31, and 32 are examples of a "first conveyor", and the color data acquisition unit conveyor 40 is an example of a "second conveyor".

A sheet 100 is conveyed in the Y-axis direction at a constant speed by the sheet conveyors 30, 31, and 32. The sheet conveyors 30, 31, and 32 are, for example, nip rollers each having two rollers. As illustrated in the drawing, the sheet conveyors 30, 31, and 32 sandwich the sheet 100 between the nip rollers, and rotate the nip rollers to convey the sheet 100.

For example, the sheet detection sensors 41 and 42 irradiate the sheet 100 with light, and detect reflected light with a photodiode or the like. Based on outputs of the sheet detection sensors 41 and 42, it is detected that the sheet 100 is located in a color data acquisition region 21 that is a region where color data are acquired by the color data acquisition unit 20.

A measurement reference surface 22 is formed of, for example, a wide guide plate that is sheet metal painted white or black. Conditions for the color in which the measurement reference surface 22 is painted differ depending on purposes as follows. In a case where it is necessary to conform to the International Organization for Standardization (ISO), or in a case where the measurement reference surface 22 is used for calibration of the image forming apparatus 2, the measurement reference surface 22 is painted black. Meanwhile, in a case where a color profile for printing is created, the measurement reference surface 22 is painted white. Thus, the measurement reference surface 22 is detachable and replaceable depending on purposes.

The color data acquisition unit conveyor 40 conveys the color data acquisition unit 20 in the width direction of the sheet. The color data acquisition unit conveyor 40 is a conveyance stage including, for example, a ball screw and a guide.

The calibration color chart 50 is used for calibration of a transformation matrix to be used for calculation of spectral characteristics. A white portion that is one of elements included in the calibration color chart 50 is used as a reference white plate 51 for calibration, to determine whether there is any abnormality in the image reading apparatus 3.

The image reading apparatus 3 can simultaneously acquire spectral characteristics at a plurality of positions in the Y-axis direction in the color data acquisition region 21 of the sheet 100.

The line illumination light source 60 illuminates the color data acquisition region 21 with linear light from a direction inclined at an angle of about 45 degrees to a normal direction of the sheet 100. In addition, the line illumination light source 60 illuminates an appropriate region of the color data acquisition region 21 such that light reflected from a region other than the color data acquisition region 21 on the sheet 100 does not enter the spectroscopic unit 80.

For example, a white light-emitting diode (LED) array having an adequate intensity in the substantially entire range of visible light can be used as the line illumination light source 60. However, the line illumination light source 60 is not limited thereto, and a fluorescent lamp such as a cold-cathode tube, a lamp light source, or the like may be used as the line illumination light source 60.

It is desirable that the line illumination light source 60 be a line illumination light source that emits light in a wavelength region necessary for separation of light into its spectral components and allows the entire color data acquisition region 21 to be uniformly illuminated. A collimator lens may be added which condenses light emitted from the line illumination light source 60 and irradiates the sheet 100 with parallel light or convergent light.

The reduction imaging lens 70 is disposed such that its optical axis coincides with the normal direction of the sheet 100. The reduction imaging lens 70 has a function of forming an image of light reflected from the sheet 100, that is, reflected light flux, on an incident surface of the spectroscopic unit 80 at a predetermined magnification. Here, addition of image-side telecentric characteristics to the reduction imaging lens 70 causes the principal ray of light flux incident on an image surface to be substantially parallel to the optical axis. The reduction imaging lens 70 may include a plurality of lenses.

It is thus possible to easily cause the principal ray of light flux incident on the image surface to be substantially parallel to the optical axis by adding image-side telecentric characteristics to the reduction imaging lens 70. Meanwhile, image-side telecentric characteristics need not be added to the reduction imaging lens 70. In that case, it is possible to obtain the same effect by adjusting, for example, a positional relationship between each pinhole of a pinhole array and each lens of a lens array to be described below according to an inclination of the principal ray at each position of the image surface.

The spectroscopic unit 80 has a function of separating, into its spectral components, light diffusely reflected after being applied to the sheet 100 and a function of outputting, as signals, received spectral components into which the light has been separated.

Note that the optical system illustrated in FIG. 2 is a so-called 45/0 optical system in which illumination light emitted from the line illumination light source 60 is incident on the sheet 100 at an angle of approximately 45 degrees, and the spectroscopic unit 80 receives light diffusely reflected in a vertical direction from the sheet 100. However, the configuration of the optical system is not limited to the configuration illustrated in FIG. 2. The optical system may be, for example, a so-called 0/45 optical system or the like in which illumination light emitted from the line illumination light source 60 is perpendicularly incident on the sheet 100, and the spectroscopic unit 80 receives light diffused in a 45-degree direction with respect to the sheet 100.

Next, a configuration of the spectroscopic unit 80 will be described.

Figure 3:
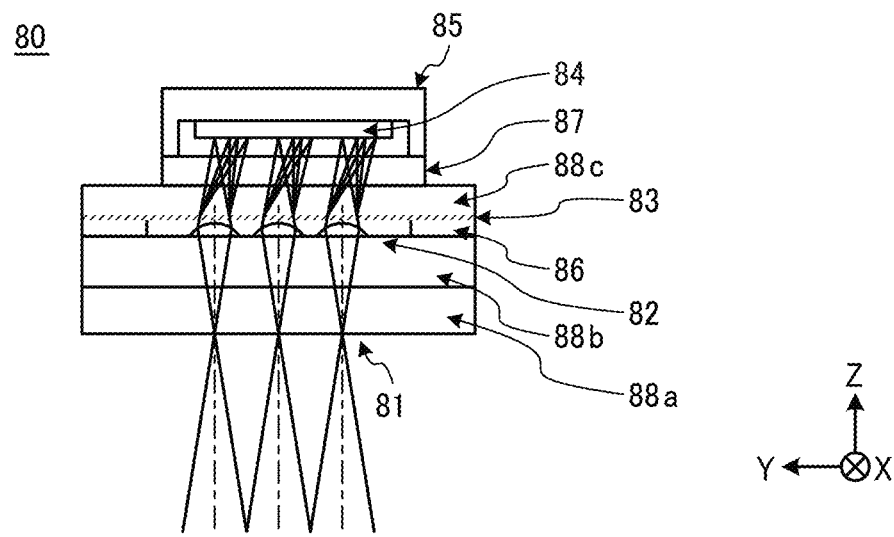
FIG. 3 is a cross-sectional view of a spectroscopic unit of the image reading apparatus according to an embodiment of the present disclosure, provided for an illustrative purpose.

FIG. 3 is a cross-sectional view of the spectroscopic unit 80 of the image reading apparatus 3, provided for illustrative purposes. FIG. 3 illustrates part of the cross section of the spectroscopic unit 80 parallel to a YZ-plane.

As illustrated in FIG. 3, the spectroscopic unit 80 includes a pinhole array 81, a lens array 82, a diffraction element 83, and an imaging element 84. The spectroscopic unit 80 also includes a package 85, a spacer 86, a cover glass 87, and glass base materials 88a to 88c.

The pinhole array 81 has pinholes as openings through which reflection from the sheet 100 passes. The pinholes are arranged, in the Z-axis direction, at the position of an image surface where light incident from the reduction imaging lens 70 forms an image, and are arranged in an array in the Y-axis direction at predetermined intervals. FIG. 3 illustrates an example in which three pinholes are arranged in the Y-axis direction.

The pinhole array 81 is integrally provided on the glass base material 88a that is a transparent tabular glass base material serving as a light transmissive frame. For example, a thin film of metal such as nickel is vapor-deposited on a transparent glass base material, and openings corresponding to pinholes are provided in an array to form the pinhole array 81. Flux of light reflected from each position in the color data acquisition region 21 of the sheet 100 is extracted by each pinhole provided in the pinhole array 81.

Note that the spectroscopic unit 80 is not limited to a spectroscopic unit that includes the pinhole array 81. Instead, the spectroscopic unit 80 may include a slit array having rectangular openings, or an oblique slit array having rectangular slits inclined with respect to the Y-axis direction.

A surface of the glass base material 88b that is a transparent tabular glass base material serving as a light transmissive frame is joined to a surface of the glass base material 88a opposite to a surface on which light reflected from the sheet 100 is incident. In addition, lenses are arranged in an array in the Y-axis direction at predetermined intervals on a surface of the glass base material 88b opposite to the surface thereof joined to the glass base material 88a.

Figure 4:
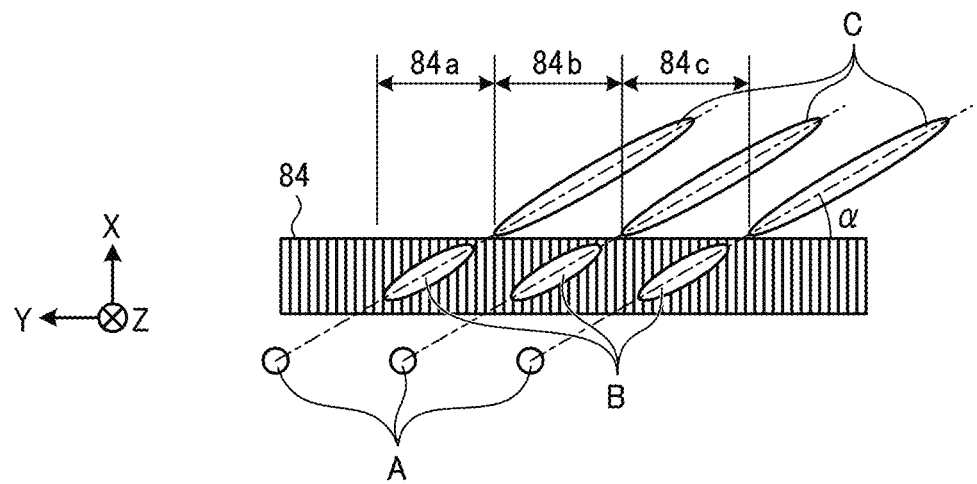
FIG. 4 is a diagram describing a diffraction image and light reception by an imaging element.

FIG. 4 is a diagram describing a diffraction image and light reception by an imaging element. FIG. 4 illustrates an example in which three lenses are arranged in the Y-axis direction to form the lens array 82. Each lens of the lens array 82 condenses light flux having passed through corresponding one of the pinholes of the pinhole array 81 to form an image on the imaging element 84.

The lens array 82 includes a plurality of lenses 82a arranged in a line in the Y-axis direction. Each lens 82a of the lens array 82 has a function of converting diffused light flux having passed through corresponding one of the openings of the pinhole array 81 into weak diffused light flux.

The weak diffused light flux refers to diffused light flux closer to parallel light flux than incident diffused light flux. That is, weak diffused light flux is diffused light flux having a smaller degree of diffusion, that is, diffused light flux weakened as compared with the incident diffused light flux.

The lenses 82a included in the lens array 82 are disposed at respective positions corresponding to the openings included in the pinhole array 81. Each lens 82a has a sufficient diameter to allow incidence of all the light having passed through the corresponding opening. However, the planar shape of each lens 82a need not be circular.

In the present embodiment, the pinhole array 81 and the lens array 82 are arranged via the glass base materials 88a and 88b, but the configuration of the pinhole array 81 and the lens array 82 is not limited thereto. The thicknesses of the glass base materials 88a and 88b are determined such that the optical path lengths of the pinhole array 81 and the lens array 82 are shorter than the object-side focal length of each lens 82a of the lens array 82. Note that, in order to eliminate stray light in the lens array 82, it is desirable to shield each lens 82a from light, except its opening.

The spectroscopic unit 80 includes the glass base material 88c provided in such a way as to face the lens array 82 in the Z-axis direction. The glass base material 88c is a transparent tabular glass base material serving as a light transmissive frame. The glass base material 88b and the glass base material 88c are joined via the spacer 86.

The spacer 86 is a member for providing a predetermined distance, that is, a space between the glass base material 88b and the glass base material 88c, and is, for example, a metal flat plate with a planar portion in which a predetermined through-hole is provided. On a side where the spacer 86 faces the lens array 82, a surface of the spacer 86 except for the through-hole is in contact with and joined to part of the glass base material 88b where no lens is provided. Furthermore, on a side where the spacer 86 faces the diffraction element 83, a surface of the spacer 86 except for the through-hole is in contact with and joined to a part of the glass base material 88c. As a result, a predetermined distance, that is, a space is provided between the glass base material 88b and the glass base material 88c. The through-hole may be provided as small holes that can each accommodate corresponding one of the lenses of the lens array 82, or may be provided as a large hole that can accommodate a plurality of the lenses.

The diffraction element 83 is provided on a surface of the glass base material 88c facing the lens array 82, that is, a surface of the glass base material 88c on which light reflected from the sheet 100 is incident. The diffraction element 83 is formed as saw teeth provided at predetermined intervals on the glass base material 88c, and functions as a diffraction grating that diffracts incident light and separates the incident light into its spectral components. Light flux having passed through each lens of the lens array 82 is separated into its spectral components by the diffraction element 83. A diffraction image corresponding to each light flux is formed on the imaging element 84.

It is desirable to use, as the diffraction element 83, a blazed diffraction grating with increased diffraction efficiency of first-order diffracted light. Using a blazed diffraction grating as the diffraction element 83 enables diffraction efficiency of only the first-order diffracted light to be increased. It is thus possible to increase light use efficiency of the optical system. As a result, it is possible to acquire a signal of sufficient quality in a short time, and to reduce the time taken to acquire spectral characteristics.

The imaging element 84 is a line sensor in which a plurality of pixels is arranged in the Y-axis direction. The imaging element 84 receives light of each diffraction image formed by the lens array 82 and the diffraction element 83 by means of a plurality of light receiving elements located at different positions, to acquire a quantity of incident light of a predetermined wavelength range. For example, a metal-oxide semiconductor (MOS), a complementary metal-oxide semiconductor (CMOS), or a charge-coupled device (CCD) can be used as the imaging element 84.

Note that the diffraction axis of the diffraction element 83 is inclined at an angle "α" with respect to the Y-axis direction. As illustrated in FIG. 4, diffraction images inclined at the angle "α" with respect to the X-axis direction are incident on the imaging element 84. FIG. 4 illustrates three diffraction patterns including zero-order diffraction images A, positive first-order diffraction images B, and positive second-order diffraction images C arranged in the Y-axis direction. The first-order diffraction images B included in the diffraction patterns are arranged such that light rays of the first-order diffraction images B are received by the imaging element 84. In FIG. 4, light rays of three first-order diffraction images formed by three lenses included in the lens array are received in pixel regions 84a, 84b, and 84c of the imaging element 84 and converted into electric signals. The electric signals are output as color data acquired by the spectroscopic unit 80.

As described above, the image reading apparatus 3 avoids crosstalk of diffraction images, so that spectral characteristics of the sheet 100 can be obtained from the positive first-order diffraction images B. In the following description, the positive first-order diffraction images B may be simply referred to as diffraction images.

The imaging element 84 is secured inside the package 85. An opening of the package 85 is covered with the cover glass 87 that is a transparent cover glass serving as a light transmissive frame. The cover glass 87 is joined to a surface of the glass base material 88c on a side where the diffraction element 83 is not formed.

One of the pinholes of the pinhole array 81, one of the lenses of the lens array 82 corresponding thereto, part of the diffraction element 83, that is, a light flux transmission unit formed by the one of the lenses, and some rows of pixels in the imaging element 84 optically functions as a single spectroscope. Therefore, the portion functioning as the single spectroscope may be hereinafter referred to as a spectroscopic sensor.

Although three spectroscopic sensors are simply illustrated in FIG. 3, the configuration of the spectroscopic unit 80 is not limited thereto, and the spectroscopic unit 80 may include a large number of spectroscopic sensors. For example, in a case where an imaging element having 1024 pixels is used as the imaging element 84 and some rows of pixels described above includes 10 pixels, 102 spectroscopic sensors can be formed. Such spectroscopic sensors are arranged in the Y-axis direction, that is, in the direction in which the sheet is conveyed, and are an example of "a plurality of spectroscopic sensors arranged in a direction in which an object is conveyed".

In the spectroscopic optical system included in the spectroscopic unit 80, the accuracy of acquiring spectral characteristics is significantly affected by a positional shift in terms of the position of the imaging element 84 relative to the diffraction images formed by the pinhole array 81, the lens array 82, and the diffraction element 83. In the present embodiment, the pinhole array 81, the lens array 82, the diffraction element 83, and the imaging element 84 are stacked in layers in a direction of the optical axis of the reduction imaging lens 70 and joined to be integrated, so as to prevent the positional shift described above.

Next, an outline of the controller 300 of the image reading apparatus 3 will be described.

Figure 5:
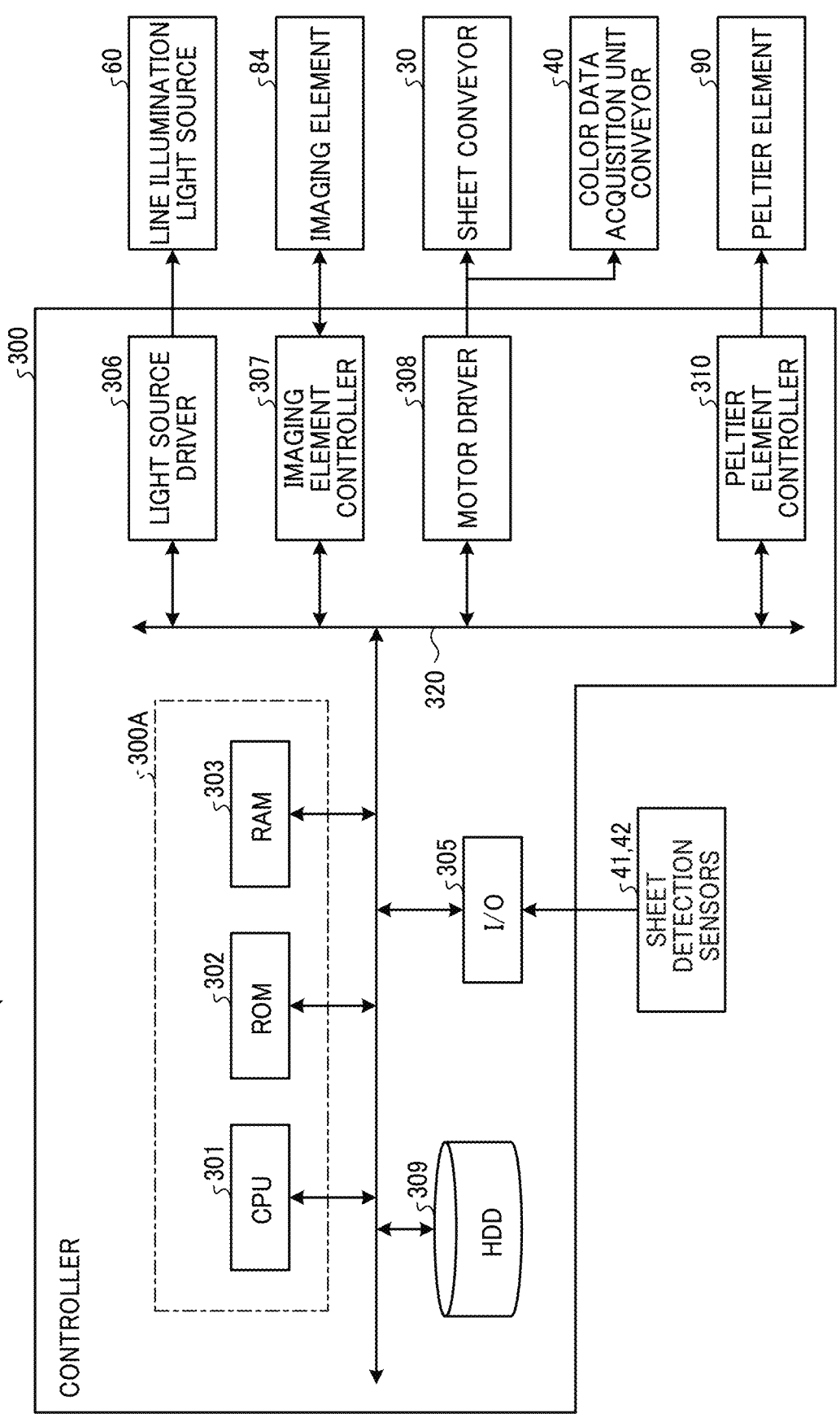
FIG. 5 is a block diagram illustrating an example of a hardware configuration of the image reading apparatus.

FIG. 5 is a block diagram illustrating an example of a hardware configuration of the image reading apparatus 3.

The controller 300 includes a main controller 300A, an input/output (I/O) 305, a light source driver 306, an imaging element controller 307, a motor driver 308, a hard disk drive (HDD) 309, and a Peltier element controller 310.

The main controller 300A includes a central processing unit (CPU) 301, a read only memory (ROM) 302, and a random access memory (RAM) 303. The CPU 301, the ROM 302, and the RAM 303 are electrically connected to each other via a system bus 320.

The CPU 301 has centralized control over operation of the image reading apparatus 3. The CPU 301 executes a program stored in the ROM 302 or the like by using the RAM 303 as a work area, to control the operation of the entire image reading apparatus 3 and implement various functions to be described below. The HDD 309 stores acquired color data and the like.

The I/O 305 receives input of, for example, signals detected by the sheet detection sensors 41 and 42.

The light source driver 306 is an electric circuit that outputs a drive signal regarding a drive voltage or the like for causing the line illumination light source 60 to emit light, according to an input control signal.

The imaging element controller 307 controls imaging to be performed by the imaging element 84, which is a line sensor included in the spectroscopic unit 80, according to an input control signal. Data on imaging performed by the imaging element 84 are transmitted as color data to the HDD 309 through the imaging element controller 307, and stored in the HDD 309. The Peltier element controller 310 controls a Peltier element 90 that is used for performing control so as to keep the imaging element 84 at a constant temperature.

The motor driver 308 is an electric circuit that outputs a drive signal regarding a drive voltage or the like to each motor that causes the sheet conveyor 30 and the color data acquisition unit conveyor 40 to operate, according to an input control signal.

Part or all of control processing to be performed by the CPU may be implemented by an electronic circuit such as a field-programmable gate array (FPGA) or an application specific integrated circuit (ASIC).

Next, a hardware configuration of the information processing apparatus 4 will be described.

Figure 6:
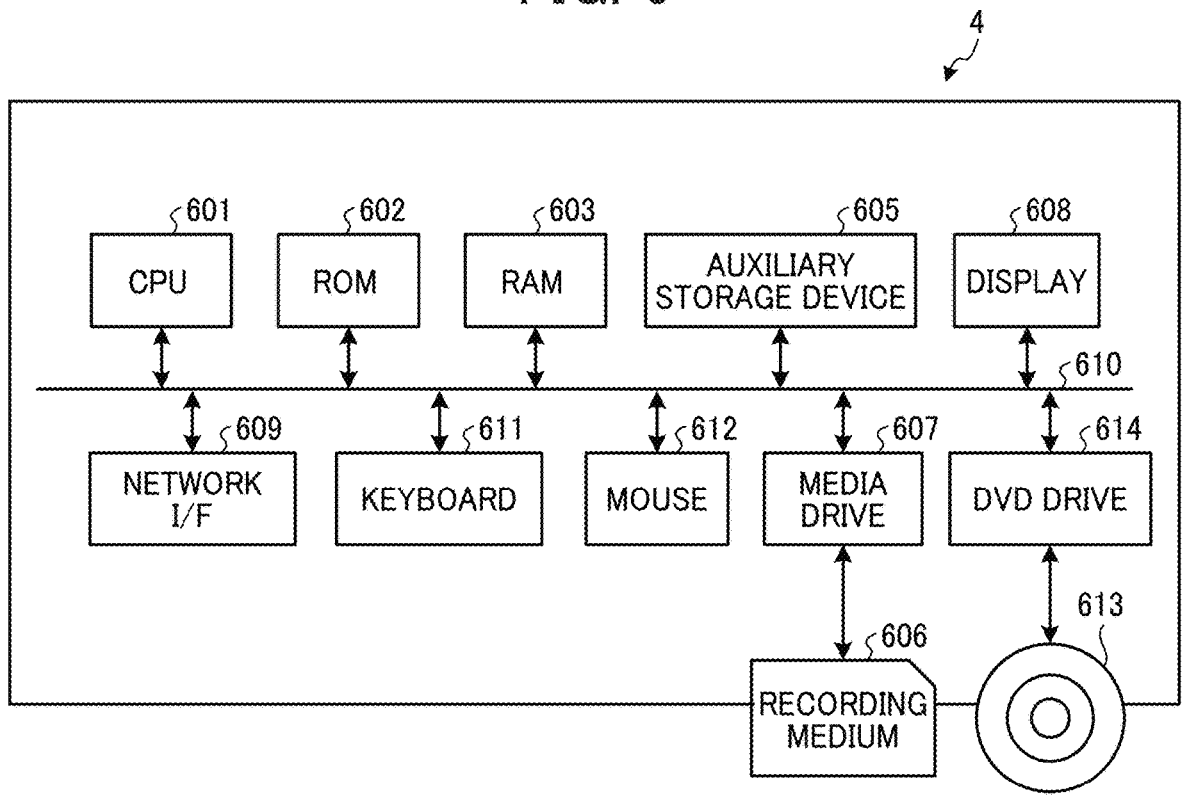
FIG. 6 is a block diagram illustrating an example of a hardware configuration of an information processing apparatus.

FIG. 6 is a block diagram illustrating an example of a hardware configuration of the information processing apparatus 4. As illustrated in FIG. 6, the information processing apparatus 4 includes a central processing unit (CPU) 601, a read only memory (ROM) 602, a random access memory (RAM) 603, an auxiliary storage device 605, a media drive 607, a display 608 (display device), a network interface (I/F) 609, a keyboard 611, a mouse 612, and a digital versatile disc (DVD) drive 614.

The CPU 601 is an arithmetic device that controls the operation of the entire information processing apparatus 4. The ROM 602 is a non-volatile storage device that stores a program for the information processing apparatus 4. The RAM 603 is a volatile storage device used as a work area for the CPU 601.

The auxiliary storage device 605 is a storage device that stores various data, a program, and the like, such as a hard disk drive (HDD) or a solid state drive (SSD). The media drive 607 is a device that controls the reading of data from and the writing of data on a recording medium 606 such as a flash memory, under the control of the CPU 601.

The display 608 is a display device that includes liquid crystal, an organic electroluminescence (EL) device, or the like that displays various types of information such as a cursor, a menu, a window, a character, or an image.

The network I/F 609 is an interface for performing data communication with external devices such as the image forming apparatus 2 and the image reading apparatus 3 by using a network N. The network I/F 609 is, for example, a network interface card (NIC) that is compatible with Ethernet (registered trademark) and allows communication conforming to TCP/IP or the like.

The keyboard 611 is an input device to be used for, for example, selecting characters, numbers, and various instructions, and moving a cursor. The mouse 612 is an input device to be used for, for example, selecting and executing various instructions, selecting a target to be processed, and moving a cursor.

The DVD drive 614 is a device that controls the reading of data from and the writing of data to a DVD 613 such as a DVD-ROM or a Digital Versatile Disc recordable (DVD-R) as an example of a detachable storage medium.

The CPU 601, the ROM 602, the RAM 603, the auxiliary storage device 605, the media drive 607, the display 608, the network I/F 609, the keyboard 611, the mouse 612, and the DVD drive 614 described above are communicably connected to each other by buses 610 such as an address bus and a data bus.

The hardware configuration of the information processing apparatus 4 illustrated in FIG. 6 is an example. The information processing apparatus 4 does not need to include all the constituent elements illustrated in FIG. 6, or may include another constituent element.

Next, a description will be given of functions to be implemented by the CPU 601 of the information processing apparatus 4 according to the program stored in the ROM 602 or the auxiliary storage device 605.

Figure 7:
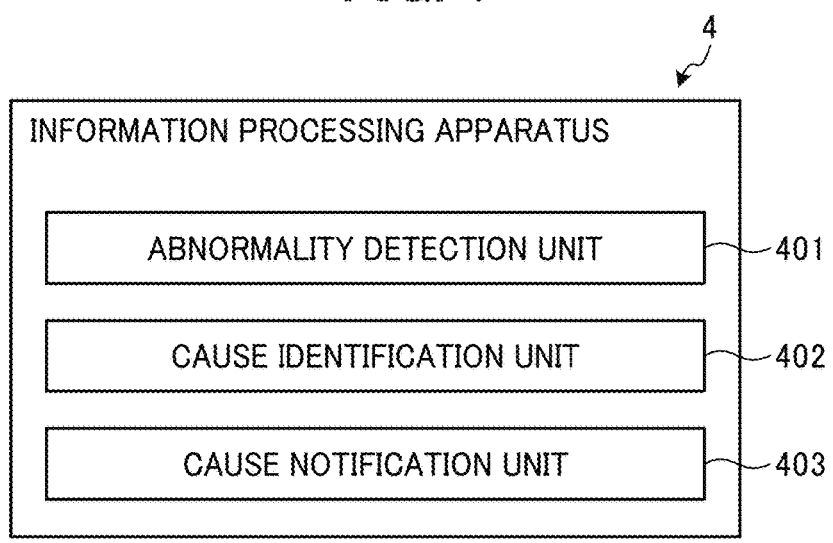
FIG. 7 is a block diagram illustrating a functional configuration of the information processing apparatus.

FIG. 7 is a block diagram illustrating a functional configuration of the information processing apparatus 4. As illustrated in FIG. 7, the information processing apparatus 4 includes an abnormality detection unit 401, a cause identification unit 402, and a cause notification unit 403.

The abnormality detection unit 401 detects an abnormality in image reading apparatus 3 from a temporal change between a first spectral reflectance and a second spectral reflectance. The first spectral reflectance is generated based on data read from the reference white plate 51. The second spectral reflectance is generated before generation of the first spectral reflectance.

When the abnormality detection unit 401 detects an abnormality, the cause identification unit 402 identifies a cause of the abnormality in the image reading apparatus 3. The imaging element 84 acquires a signal value yet to be converted into a spectral reflectance. The cause identification unit 402 of the information processing apparatus 4 detects an abnormality by using the signal value acquired by the imaging element 84. Note that the signal value of the imaging element 84 is converted into a spectral reflectance by use of a transformation matrix created from learning data. The learning data are used as transformation matrix data including two types of data, that is, signal values and spectral reflectances associated with each other in advance based on several hundred to several thousand color samples. The signal values refer to signal values acquired by the imaging element 84. The spectral reflectances refer to spectral reflectances of color samples, acquired by a reference colorimeter.

The cause notification unit 403 notifies a user of the cause of the abnormality in the image reading apparatus 3 identified by the cause identification unit 402 and a countermeasure.

With the functional configuration described above, the information processing apparatus 4 determines whether there is an abnormality in the state of the image reading apparatus 3 from a temporal change in the result of measuring the reference white plate 51 of the calibration color chart 50. When determining that there is an abnormality, the information processing apparatus 4 performs analysis and identification of a cause of the abnormality, and notifies the user of a countermeasure.

Next, a flow of quality evaluation processing will be described.

Figure 8:
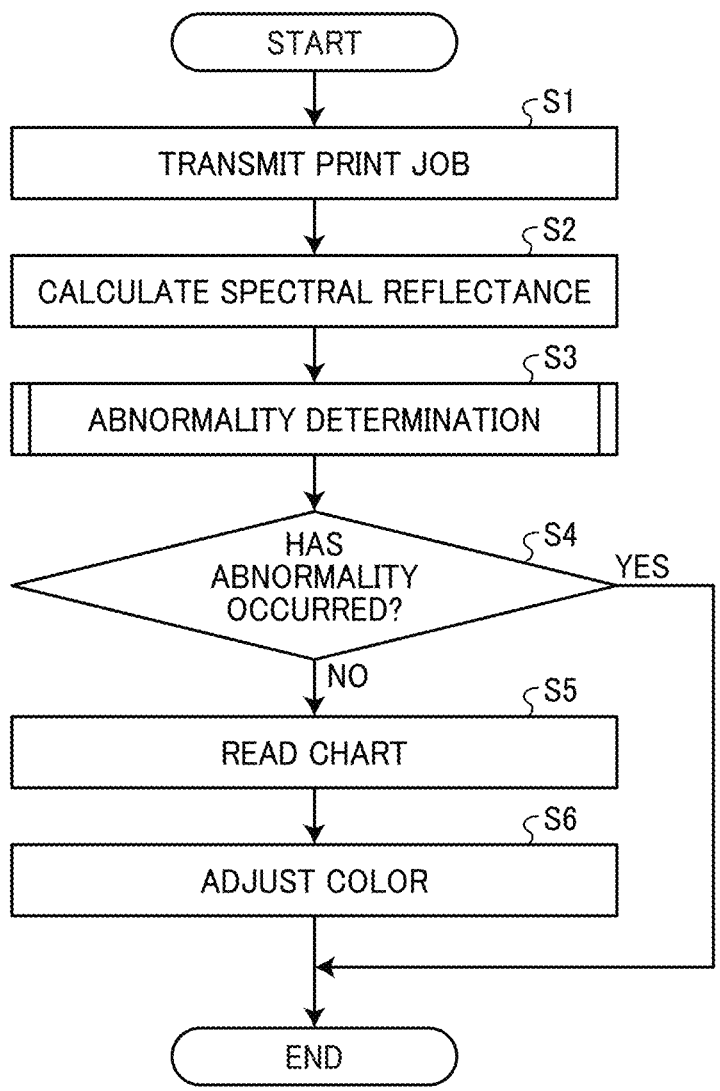
FIG. 8 is a flowchart illustrating a flow of quality evaluation processing.

FIG. 8 is a flowchart illustrating a flow of quality evaluation processing. As illustrated in FIG. 8, the abnormality detection unit 401 of the information processing apparatus 4 transmits predetermined image data (quality evaluation chart) as a print job to the image forming apparatus 2 to be subjected to quality evaluation (step S1). The predetermined image data are used for performing color adjustment of the image forming apparatus 2. Note that the image data are stored in a predetermined format in the ROM 602 or the auxiliary storage device 605 of the information processing apparatus 4.

The image forming apparatus 2 that has received the print job prints the quality evaluation chart based on the received print job.

Before reading the printed quality evaluation chart, the image reading apparatus 3 reads, as the reference white plate 51, a white portion of the calibration color chart 50 disposed in the image reading apparatus 3, and converts the white portion into electronic data. When reading the reference white plate 51, the image reading apparatus 3 moves the color data acquisition unit 20 in such a way as to locate the color data acquisition unit 20 immediately above the reference white plate 51, and performs imaging for a predetermined period of time in a state where the color data acquisition unit 20 is stationary.

Figure 9:
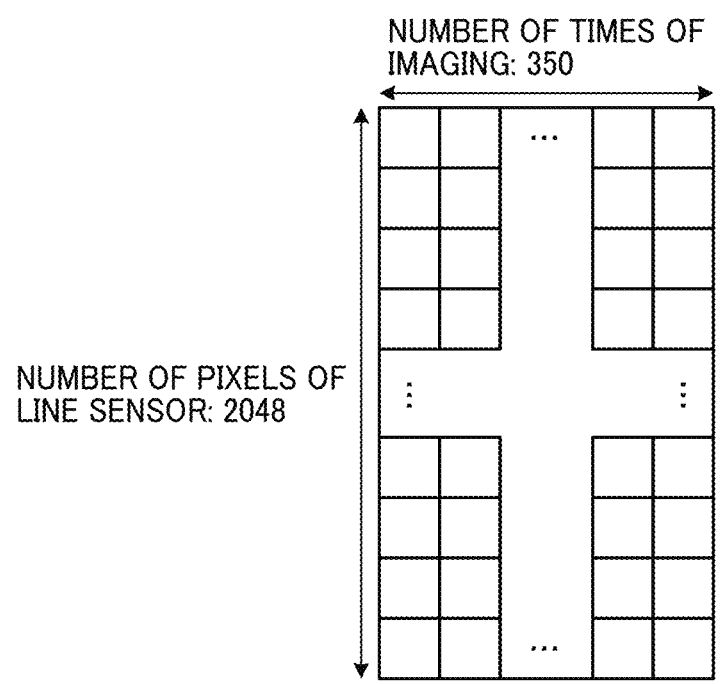
FIG. 9 is a diagram illustrating an example of obtained data.

FIG. 9 is a diagram illustrating obtained data. The number of times imaging is performed is determined from the relationship between imaging time and the imaging frequency of the imaging element 84, which is a line sensor, as follows: imaging time×imaging frequency=number of times imaging is performed. Therefore, as illustrated in FIG. 9, line sensor pixels corresponding to the number of times imaging is performed are obtained in a direction orthogonal to the array direction of the imaging element 84 which is a line sensor. That is, the image reading apparatus 3 acquires the number of pixels of the electronic data on the reference white plate 51 as a two-dimensional array given as follows: number of sensor pixels×number of times imaging is performed. For example, in a case where the number of sensor pixels is 2048, the imaging time is 1.46 seconds, and the imaging frequency is 240 Hz, the number of times imaging is performed is calculated as 1.46×240=350 times. Therefore, the number of pixels of the electronic data on the reference white plate 51 is obtained as 2048×350 pixels, as illustrated in FIG. 9.

The abnormality detection unit 401 of information processing apparatus 4 receives the electronic data on the reference white plate 51 acquired by image reading apparatus 3, and calculates spectral reflectance data (first spectral reflectance) according to a predetermined procedure (step S2). Specifically, the abnormality detection unit 401 of the information processing apparatus 4 calculates spectral reflectance data (first spectral reflectance) by using the transformation matrix on the basis of the acquired electronic data (color data) on the reference white plate 51.

Next, the abnormality detection unit 401 of the information processing apparatus 4 executes abnormality determination processing in which whether there is an abnormality in the image reading apparatus 3 is determined (step S3).

Figure 10B:
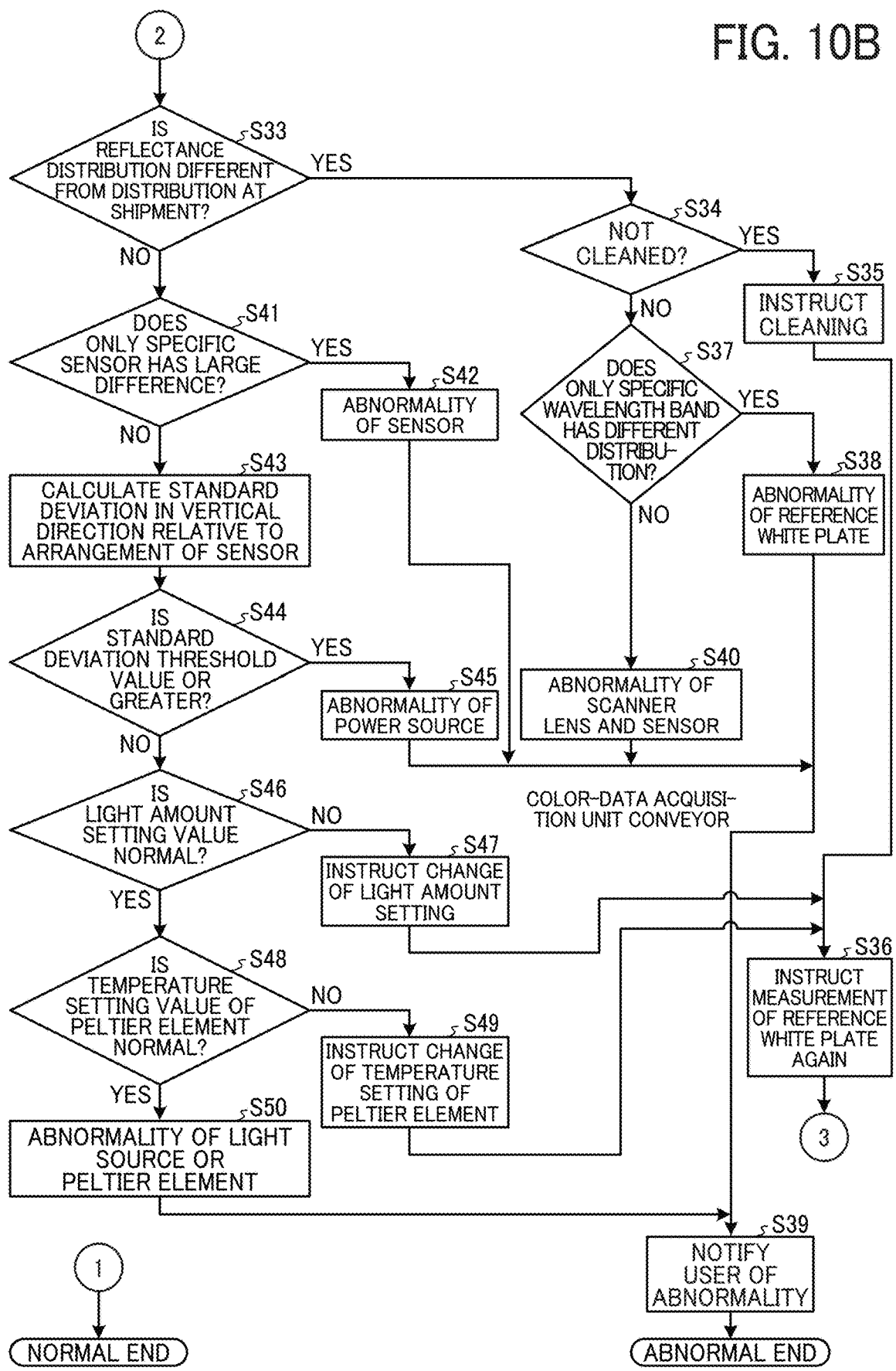

FIG. 10 including FIGS. 10A and 10B is a flowchart illustrating a flow of the abnormality determination processing.

First, the abnormality detection unit 401 of the information processing apparatus 4 compares spectral reflectance data (second spectral reflectance) on the reference white plate 51 prepared in advance in a storage unit of the information processing apparatus 4 at the time of shipment, with current spectral reflectance data (first spectral reflectance) on the reference white plate 51 calculated in step S2.

Note that the wavelength band of spectral reflectance to be observed is in the visible range of 400 nm to 700 nm. For example, it is conceivable that the following method is used for comparison. A difference between the spectral reflectance data obtained at the time of shipment and the current spectral reflectance data is calculated, and a portion where the difference exceeds a predetermined threshold is regarded as abnormal. In addition, examples of other comparison methods include a method for considering a ratio between the spectral reflectance data obtained at the time of shipment and the current spectral reflectance data, and a method for calculating similarity between the spectral reflectance data by using statistics such as the Mahalanobis distance. In the present embodiment, a case where evaluation is performed by use of a difference in spectral reflectance will be described as an example.

The abnormality detection unit 401 of the information processing apparatus 4 calculates a difference between the spectral reflectance data obtained at the time of shipment and the current spectral reflectance data (step S31).

The abnormality detection unit 401 of the information processing apparatus 4 gives a predetermined threshold to each of the maximum value of the difference between the spectral reflectance data obtained at the time of shipment and the current spectral reflectance data, and the average value of all the pixels. When the maximum value and the average value are less than the thresholds (No in step S32), the abnormality detection unit 401 determines that there is no abnormality in the image reading apparatus 3, and ends the abnormality determination flow.

Meanwhile, when at least one of the maximum value and the average value is equal to or greater than the threshold (Yes in step S32), the abnormality detection unit 401 of the information processing apparatus 4 determines that there is a possibility that an abnormality has occurred in the image reading apparatus 3. Then, the process proceeds to step S33 so as to identify a cause.

Next, the cause identification unit 402 of the information processing apparatus 4 compares the distribution of the spectral reflectance obtained at the time of shipment with the distribution of the current spectral reflectance (step S33).

When determining that the distribution of the spectral reflectance obtained at the time of shipment is different from the distribution of the current spectral reflectance (Yes in step S33), the cause identification unit 402 of the information processing apparatus 4 determines whether cleaning is yet to be performed (step S34). It is conceivable that the distribution of the spectral reflectance obtained at the time of shipment will be different from the distribution of the current spectral reflectance in a case where dirt on the reference white plate 51, the reduction imaging lens 70, or the imaging element 84, which is a line sensor, is regarded as an abnormality, and in a case where an abnormality occurs due to a defect in any of parts itself.

Figures 11, 12:
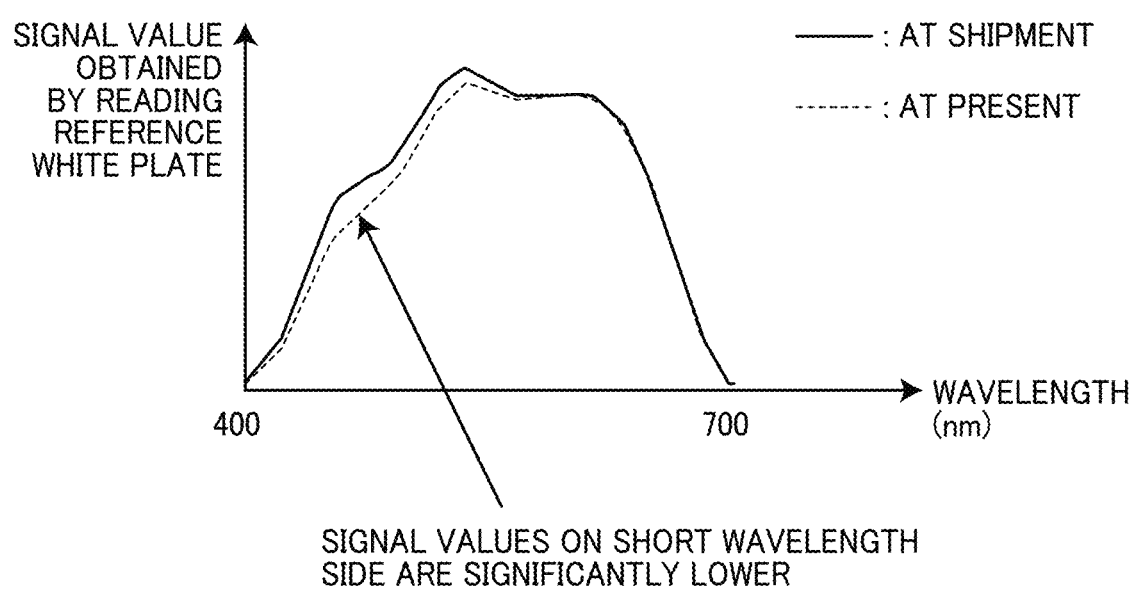
FIG. 11 is a diagram illustrating an example of a dialogue screen regarding cleaning.
FIG. 12 is a diagram illustrating an example of a change in a signal value due to yellowing of a reference white plate.

Note that the user determines whether cleaning has been performed. FIG. 11 is a diagram illustrating an example of a dialogue screen regarding cleaning. The cause identification unit 402 of the information processing apparatus 4 displays the dialogue screen illustrated in FIG. 11 on the display 608 (display device) of the information processing apparatus 4 at the stage of step S34 in which it is determined whether cleaning is yet to be performed. In a case where a "YES" button has been pressed by the user, the cause identification unit 402 of the information processing apparatus 4 determines that cleaning has already been performed. In a case where a "NO" button has been pressed by the user, the cause identification unit 402 of the information processing apparatus 4 determines that cleaning is yet to be performed.

Therefore, in a case where cleaning of parts is yet to be performed (Yes in step S34), the cause notification unit 403 of the information processing apparatus 4 instructs the user to perform cleaning (step S35).

Furthermore, after the user completes cleaning, the cause notification unit 403 of the information processing apparatus 4 issues an instruction to measure the reference white plate 51 again (step S36). Then, the process returns to step S31.

Meanwhile, in a case where the cleaning has already been completed but it is determined that there is an abnormality (No in step S34), the cause identification unit 402 of the information processing apparatus 4 proceeds to step S37, and identifies an abnormal part by focusing on a wavelength range in which the spectral reflectance obtained at the time of shipment and the current spectral reflectance differ in distribution (step S37). It is conceivable that in a case where the image reading apparatus 3 is used for a long time, the reference white plate 51 may deteriorate and turn yellow.

Here, a description will be given of the above-described case where a signal value changes due to yellowing of the reference white plate 51. FIG. 12 is a diagram illustrating an example of a change in a signal value due to yellowing of the reference white plate 51. As illustrated in FIG. 12, when the reference white plate 51 turns yellow, the spectral reflectance of the reference white plate 51 has a tendency to be remarkably low on a relatively short wavelength side. Therefore, the cause identification unit 402 of the information processing apparatus 4 identifies an abnormal part by focusing on a wavelength range in which the spectral reflectance obtained at the time of shipment and the current spectral reflectance differ in distribution.

When a difference is observed in a specific wavelength range (Yes in step S37), the cause identification unit 402 of the information processing apparatus 4 determines that there is an abnormality due to deterioration of the reference white plate 51 (step S38). The cause notification unit 403 of the information processing apparatus 4 notifies the user of the cause of the abnormality and a countermeasure (step S39), and ends the processing.

Figure 13:
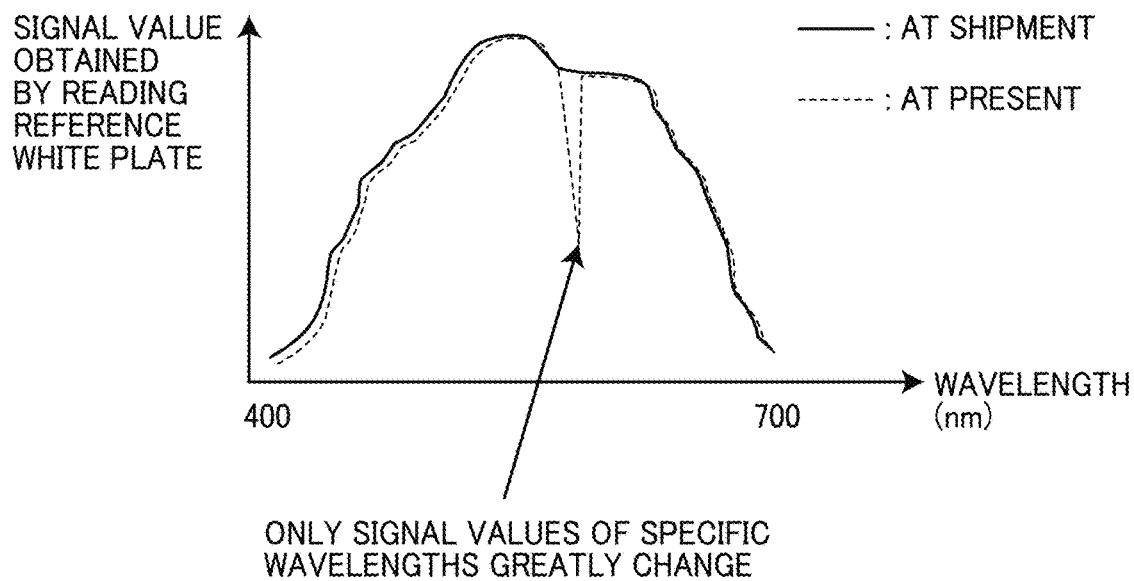
FIG. 13 is a diagram illustrating an example of a change in a signal value in which a difference is observed in a specific wavelength range.

FIG. 13 is a diagram illustrating an example of a change in a signal value in which a difference is observed in a specific wavelength range. As illustrated in FIG. 13, in a case where only a signal value of a specific wavelength greatly changes and a difference is observed in a specific wavelength range, it is conceivable that the reference white plate 51 may have deteriorated.

Meanwhile, when there is a difference in spectral reflectance not only in the specific wavelength range but also in the entire wavelength range (No in step S37), the cause identification unit 402 of the information processing apparatus 4 determines that there is an abnormality in the reduction imaging lens 70 or the imaging element 84 which is a line sensor (step S40). The cause notification unit 403 of the information processing apparatus 4 notifies the user of the determination (step S39), and ends the processing.

Figure 14:
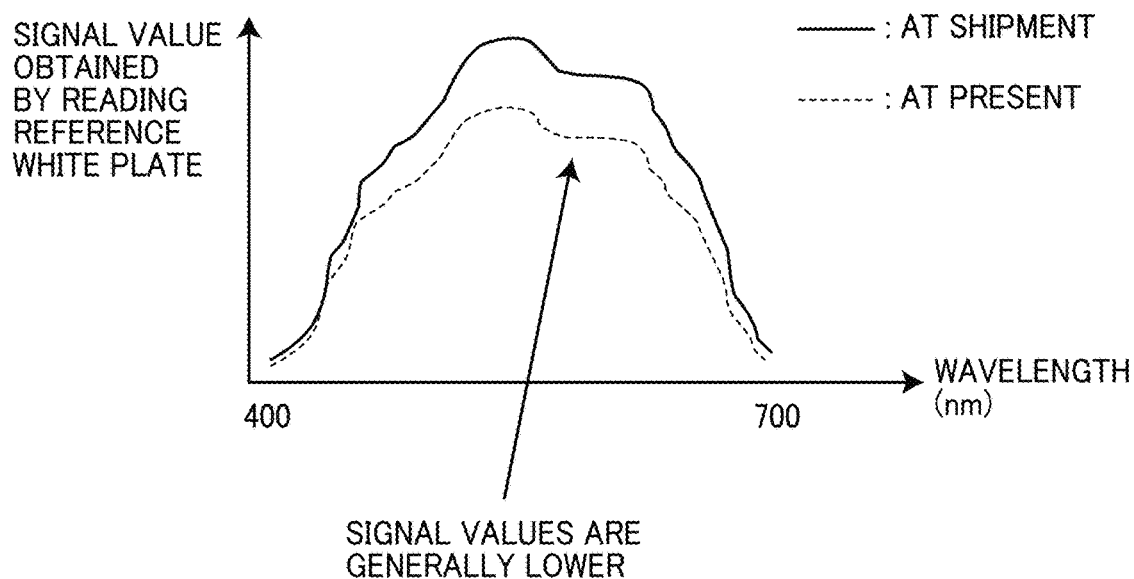
FIG. 14 is a diagram illustrating an example of a change in a signal value in which a difference in spectral reflectance is observed in the entire wavelength range.

FIG. 14 is a diagram illustrating an example of a change in a signal value in which a difference in spectral reflectance is observed in the entire wavelength range. As illustrated in FIG. 14, in a case where a signal value changes such that a difference in spectral reflectance is observed in the entire wavelength range, it is conceivable that there may be a defect in the reduction imaging lens 70 or the imaging element 84 which is a line sensor.

Meanwhile, when the cause identification unit 402 of the information processing apparatus 4 determines that there is no difference in distribution between the spectral reflectance obtained at the time of shipment and the current spectral reflectance (No in step S33), it is conceivable that the imaging element 84, which is a line sensor, or a power supply may be abnormal, or that the setting of the light quantity of the line illumination light source 60 or the setting of the temperature of the Peltier element 90 for performing control so as to keep the imaging element 84 at a constant temperature may have changed. Therefore, the process proceeds to step S41.

The cause identification unit 402 of the information processing apparatus 4 checks whether a difference between the spectral reflectance obtained at the time of shipment and the current spectral reflectance is significantly larger in any of a plurality of sensors of the imaging element 84, which is a line sensor, than in other sensors (step S41). That is, as illustrated in FIG. 13, the cause identification unit 402 of the information processing apparatus 4 checks whether the difference is significantly larger in any of the plurality of sensors than in the other sensors.

When the difference is significantly larger in a specific sensor than in the other sensors (Yes in step S41), the cause identification unit 402 of the information processing apparatus 4 determines that part of the imaging element 84, which is a line sensor, has failed and an abnormality has occurred (step S42). The cause notification unit 403 of the information processing apparatus 4 notifies the user of the determination (step S39), and ends the processing.

Meanwhile, when the difference is larger not only in a specific sensor but also in the entire imaging element 84 which is a line sensor (No in step S41), the cause identification unit 402 of the information processing apparatus 4 calculates variation in the spectral reflectance distribution in a direction perpendicular to the sensor arrangement (step S43). It is conceivable that, for example, a standard deviation will be used as an index representing the variation, but the index is not limited thereto.

Next, the cause identification unit 402 of the information processing apparatus 4 checks whether the standard deviation is equal to or greater than a threshold (step S44). When determining that the standard deviation is equal to or greater than the threshold (Yes in step S44), the cause identification unit 402 of the information processing apparatus 4 determines that the power supply has failed and an abnormality has occurred (step S45). The cause notification unit 403 of the information processing apparatus 4 notifies the user of the determination (step S39), and ends the processing.

Meanwhile, when determining that the standard deviation is less than the threshold (No in step S44), the cause identification unit 402 of the information processing apparatus 4 checks whether the setting of the light quantity of the line illumination light source 60 is correct (step S46).

When the setting of the light quantity of the line illumination light source 60 is incorrect (No in step S46), the cause notification unit 403 of the information processing apparatus 4 instructs the user to change the setting value to a correct setting value (step S47). Then, the process proceeds to step S36. Note that the cause identification unit 402 of the information processing apparatus 4 may automatically correct the setting value of the light quantity of the line illumination light source 60.

Meanwhile, when the setting of the light quantity of the line illumination light source 60 is normal (Yes in step S46), the cause identification unit 402 of the information processing apparatus 4 checks whether the setting of the temperature of the Peltier element 90 is correct (step S48).

When the setting of the temperature of the Peltier element 90 is incorrect (No in step S48), the cause notification unit 403 of the information processing apparatus 4 instructs the user to change the setting value to a correct setting value (step S49). Then, the process proceeds to step S36. Note that the cause identification unit 402 of the information processing apparatus 4 may automatically correct the setting value of the temperature of the Peltier element 90.

Meanwhile, when the setting of the temperature of the Peltier element 90 is correct (Yes in step S48), the cause identification unit 402 of the information processing apparatus 4 determines that at least one of the line illumination light source 60 or the Peltier element 90 has failed and an abnormality has occurred (step S50). The cause notification unit 403 of the information processing apparatus 4 notifies the user of the determination (step S39), and ends the processing.

In the present embodiment, the cause notification unit 403 notifies the user of the cause of the abnormality in the image reading apparatus 3 identified by the cause identification unit 402 and a countermeasure, as described above. Examples of the cause of the abnormality in the image reading apparatus 3 and a countermeasure include the following.

When cleaning is yet to be performed (Yes in step S34 in FIG. 10), the cause notification unit 403 notifies the user of a countermeasure, that is, instructs the user to clean the reference white plate 51, the reduction imaging lens 70, the imaging element 84 as a line sensor, and the like.

When there is an abnormality in the sensor (step S42 in FIG. 10), an abnormality in the power supply (step S45 in FIG. 10), an abnormality in the reference white plate (step S38 in FIG. 10), an abnormality in the light source or the Peltier element (step S50 in FIG. 10), or an abnormality in the scanner lens or the sensor (step S40 in FIG. 10), the cause notification unit 403 notifies the user of a countermeasure, that is, instructs the user to replace parts.

When there is an abnormality in the light quantity setting value (step S47 in FIG. 10) or an abnormality in the Peltier element temperature setting value (step S49 in FIG. 10), the cause notification unit 403 notifies the user of a countermeasure, that is, instructs the user to correct the setting value.

Thus, the abnormality determination processing in step S3 is ended.

Referring back to FIG. 8, when determining that there is no abnormality (No in step S4), the abnormality detection unit 401 of the information processing apparatus 4 causes the image reading apparatus 3 to read the quality evaluation chart as it is (step S5). Then, the process proceeds to a color adjustment process (step S6).

Meanwhile, when determining that there is an abnormality (Yes in step S4), the abnormality detection unit 401 of the information processing apparatus 4 ends the processing.

Here, the color adjustment process to be performed in step S6 will be described.

Possible color adjustments to be performed in the color adjustment process include color adjustment to be performed by calibration in which color density adjustment of the image forming apparatus 2 is performed, and color adjustment to be performed by means of a color profile for printing created for the image forming apparatus 2.

As color adjustment, it is possible to perform either one of the color adjustments, that is, color adjustment to be performed by calibration in which color density adjustment is performed or color adjustment to be performed by creation of the color profile for printing. Alternatively, both of the color adjustments may be sequentially performed.

Color adjustment is performed by use of a quality evaluation chart printed by the image forming apparatus 2. The quality evaluation chart includes predetermined color patches arranged therein. At that time, quality evaluation charts different in color patch arrangement are used for color adjustment to be performed by calibration and color adjustment to be performed by creation of the color profile. The quality evaluation charts are stored in the ROM 602 or the auxiliary storage device 605 of the information processing apparatus 4 in a predetermined format.

Figure 15:
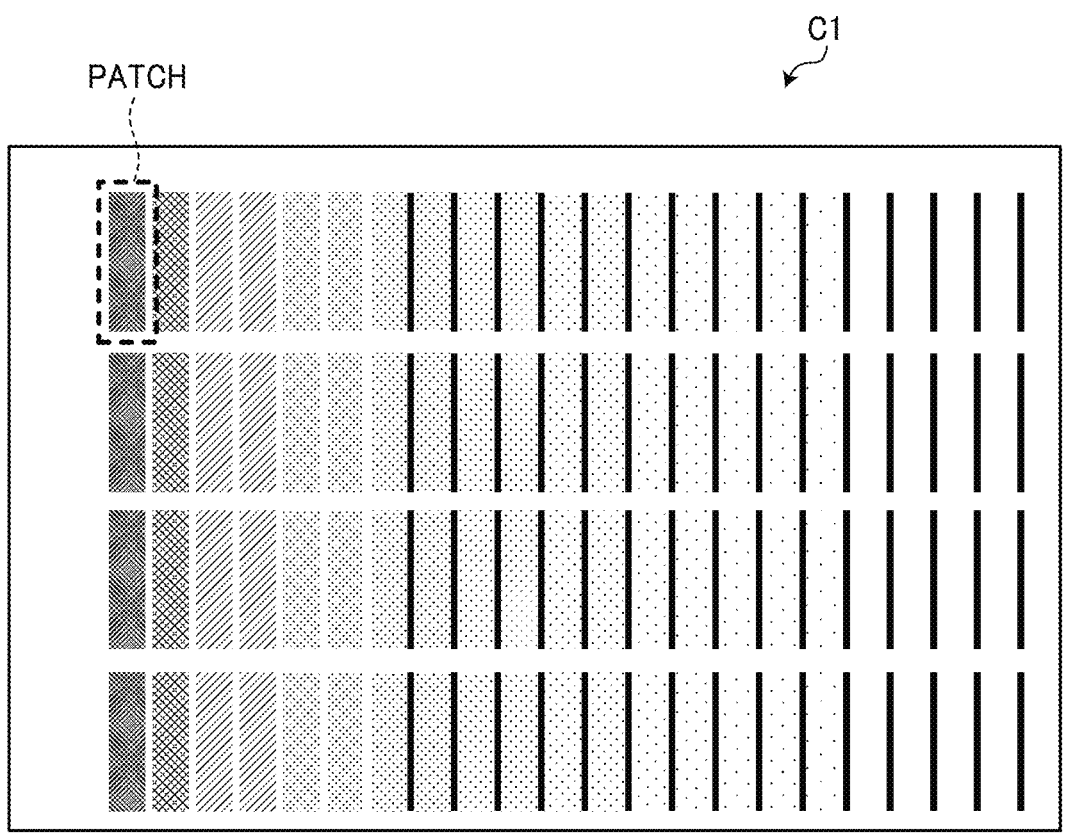
FIG. 15 is a diagram illustrating an example of a quality evaluation chart for use in calibration.
Figure 16:
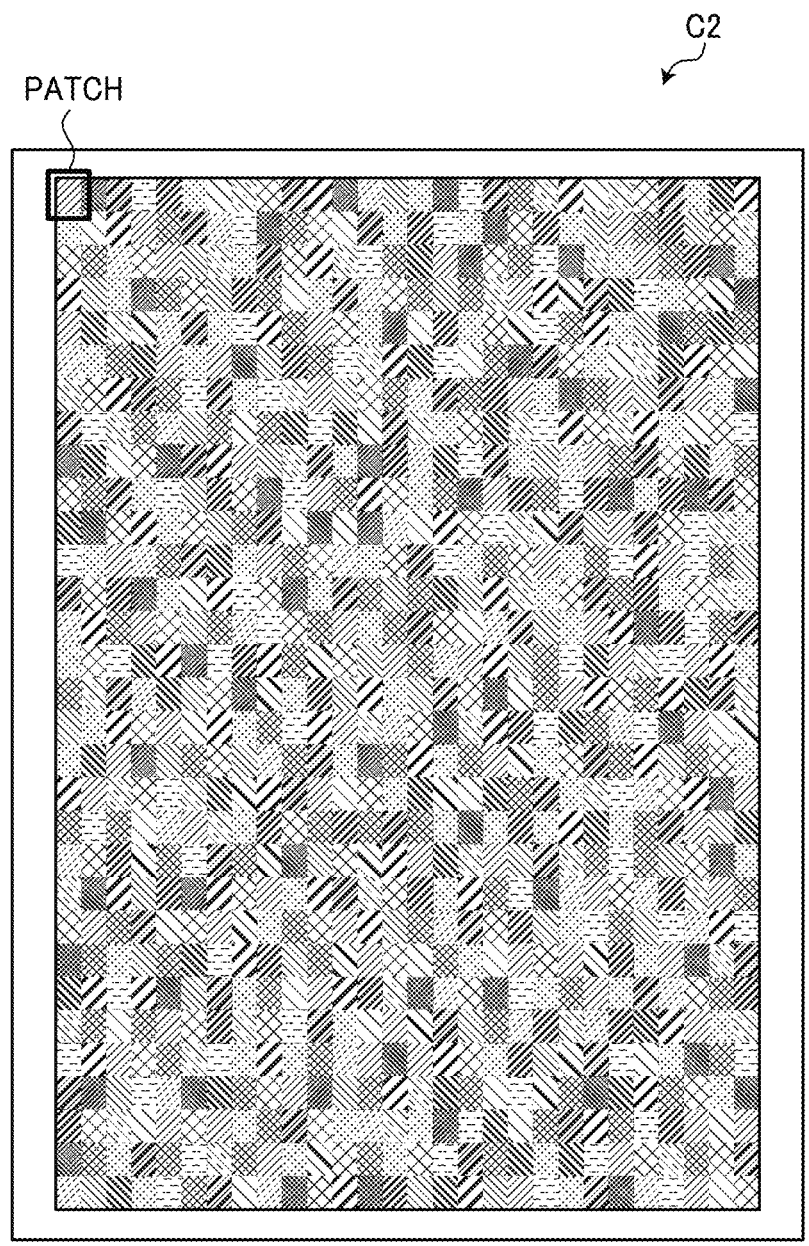
FIG. 16 is a diagram illustrating an example of a quality evaluation chart for use in creation of a color profile.

FIG. 15 is a diagram illustrating an example of a quality evaluation chart C1 for use in calibration. FIG. 16 is a diagram illustrating an example of a quality evaluation chart C2 for use in creation of a color profile. As illustrated in FIG. 15, color patches are arranged in the quality evaluation chart C1 for use in calibration such that color density is changed separately for each of colors of cyan (C), magenta (M), yellow (Y), and black (K) in a stepwise manner. As illustrated in FIG. 16, many color patches are arranged in the quality evaluation chart C2 for use in creation of a color profile such that the colors of C, M, Y, and K are not only used separately as a single color, but also used as mixed colors.

Next, a processing flow of the color adjustment process to be performed in step S6 will be described.

Figure 17:
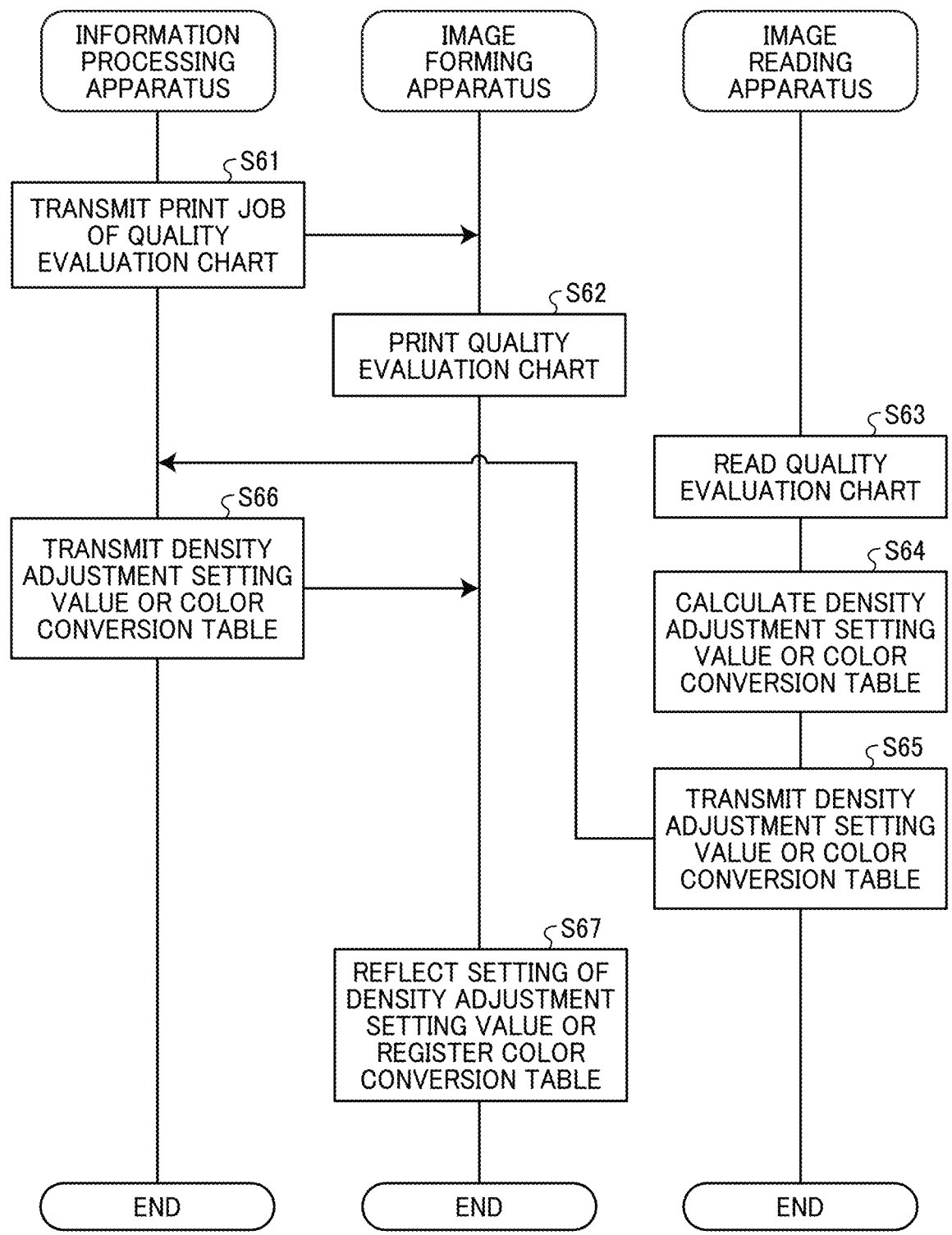
FIG. 17 is a sequence diagram illustrating a processing flow of a color adjustment process.

FIG. 17 is a sequence diagram illustrating a processing flow of the color adjustment process. As illustrated in FIG. 17, when it is determined that there is no abnormality in the image reading apparatus 3, the abnormality detection unit 401 of the information processing apparatus 4 transmits a print job of a quality evaluation chart to the image forming apparatus 2 (step S61).

The image forming apparatus 2 that has received the print job prints the quality evaluation chart based on the received print job (step S62).

The image reading apparatus 3 reads the quality evaluation chart printed by the image forming apparatus 2 (step S63).

Next, the image reading apparatus 3 calculates a setting value for density adjustment, or calculates a color conversion table (step S64). Specifically, color patches are arranged in the quality evaluation chart for use in color adjustment to be performed by calibration such that color density is changed separately for each of the colors of C, M, Y, and K in a stepwise manner. Therefore, in the case of color adjustment to be performed by calibration, the image reading apparatus 3 calculates a setting value for density adjustment of the image forming apparatus 2 in such a way as to keep density of the color patches at a predetermined level. Meanwhile, color patches are arranged in the quality evaluation chart for use in creation of a color profile such that the colors of C, M, Y, and K are not only used separately as a single color, but also used as mixed colors. Therefore, in the case of creation of a color profile, the image reading apparatus 3 calculates a color conversion table such that color patches of desired colors are arranged in the quality evaluation chart.

Next, the image reading apparatus 3 transmits the calculated setting value for density adjustment or the calculated color conversion table to the information processing apparatus 4 (step S65).

The information processing apparatus 4 transmits the received setting value for density adjustment or the received color conversion table to the image forming apparatus 2 (step S66). Specifically, the information processing apparatus 4 transmits the received setting value for density adjustment to the image forming apparatus 2, and instructs the image forming apparatus 2 to set the setting value for density adjustment. Alternatively, the information processing apparatus 4 transmits the received color conversion table to the image forming apparatus 2, and instructs the image forming apparatus 2 to register the color conversion table.

Finally, the image forming apparatus 2 that has received the above-described instruction reflects the setting of the setting value for density adjustment, or registers the color conversion table (step S67).

As described above, according to the present embodiment, the information processing apparatus 4 determines whether there is an abnormality in the state of the image reading apparatus 3 from a temporal change in the result of measuring the reference white plate 51 of the calibration color chart 50. When determining that there is an abnormality, the information processing apparatus 4 performs analysis and identification of a cause of the abnormality, and notifies the user of a countermeasure. As a result, it is possible to detect an abnormality in the image reading apparatus 3 without registering sheet information in advance, and is thus possible to appropriately evaluate the state of the image forming apparatus 2. If there is an abnormality in the image reading apparatus 3, it is possible to clearly inform the user of the existence of the abnormality and a possible cause, so that the user can notice the abnormality and take appropriate measures.

The program to be executed by the information processing apparatus 4 of the present embodiment is provided as a file recorded in an installable format or an executable format on a computer-readable recording medium such as a CD-ROM, a flexible disk (FD), a CD-R, or a DVD.

Alternatively, the program to be executed by the information processing apparatus 4 of the present embodiment may be provided such that the program is stored on a computer connected to a network such as the Internet and downloaded via the network. Furthermore, the program to be executed by the information processing apparatus 4 of the present embodiment may be provided or distributed via a network such as the Internet. In addition, the program to be executed by the information processing apparatus 4 of the present embodiment may be embedded in a ROM or the like in advance before being provided.

In the above-described embodiment, an inkjet image forming apparatus has been described as an example of the image forming apparatus according to an embodiment of the present disclosure. However, the present embodiment can be applied to various types of image forming apparatus such as an electrophotographic image forming apparatus. The image forming apparatus according to an embodiment of the present disclosure can also be applied to any image forming apparatus such as a copying machine, a printer, a scanner device, a facsimile device, and a multifunction peripheral having at least two of a copy function, a print function, a scanning function, and a facsimile function.

The information processing apparatus, the program, the abnormality detection method, and the information processing system according to some embodiments of the present disclosure have been described above. Meanwhile, embodiments of the present disclosure are not limited to the above-described embodiments, and various modifications and improvements can be made within the scope of the present disclosure.

Aspects of the present disclosure are, for example, as follows.

Aspect 1

An information processing apparatus includes: an abnormality detection unit to detect an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance; and a cause identification unit to identify a cause of an abnormality in the image reading apparatus in a case where the abnormality detection unit detects the abnormality.

Aspect 2

In the information processing apparatus according to aspect 1, the abnormality detection unit detects the abnormality in the image reading apparatus by using at least one of a difference between the first spectral reflectance and the second spectral reflectance, a ratio between the first spectral reflectance and the second spectral reflectance, or a degree of similarity between the first spectral reflectance and the second spectral reflectance based on statistics.

Aspect 3

In the information processing apparatus according to aspect 1 or 2, the abnormality detection unit sets a wavelength band of each of the first spectral reflectance and the second spectral reflectance to be used for abnormality detection to 400 nm to 700 nm, the first spectral reflectance and the second spectral reflectance being.

Aspect 4

In the information processing apparatus according to aspect 1 or 2, the cause identification unit identifies the cause of the abnormality in the image reading apparatus based on the first spectral reflectance and the second spectral reflectance in a specific wavelength range.

Aspect 5

In the information processing apparatus according to aspect 1 or 2, the cause identification unit identifies the cause of the abnormality in the image reading apparatus by using the first spectral reflectance and the second spectral reflectance of one or more sensors included in a line sensor installed in the image reading apparatus.

Aspect 6

In the information processing apparatus according to aspect 1 or 2, the cause identification unit identifies the cause of the abnormality in the image reading apparatus by using sensor information obtained in a direction orthogonal to an array direction of a line sensor installed in the image reading apparatus.

Aspect 7

The information processing apparatus according to any one of aspects 1 to 6, further includes a cause notification unit to notify a user of the cause of the abnormality in the image reading apparatus and a countermeasure to the cause, the cause being identified by the cause identification unit.

Aspect 8

In the information processing apparatus according to aspect 7, in a case where a predetermined setting value in the image reading apparatus is incorrect, the cause identification unit automatically corrects the setting value.

Aspect 9

A program causes a computer that controls an information processing apparatus, to function as: an abnormality detection unit that detects an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance; and a cause identification unit that identifies a cause of an abnormality in the image reading apparatus in a case where the abnormality detection unit detects the abnormality.

Aspect 10

An abnormality detection method to be executed in an information processing apparatus, the abnormality detection method including: an abnormality detection step of detecting an abnormality in an image reading apparatus from a first spectral reflectance and a second spectral reflectance, the first spectral reflectance being generated based on data read from a reference white plate installed in the image reading apparatus, the second spectral reflectance being generated before generation of the first spectral reflectance; and a cause identification step of identifying a cause of an abnormality in the image reading apparatus in a case where the abnormality is detected in the abnormality detection step.

Aspect 11

An information processing system includes: an image reading apparatus that reads a reference white plate; and the information processing apparatus according to any one of aspects 1 to 8.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising processing circuitry configured to:
    detect an abnormality in an image reading apparatus from a first spectral reflectance and a second spectral reflectance, the first spectral reflectance being generated based on data read, by one line sensor, from a reference white plate installed in the image reading apparatus, the second spectral reflectance being stored in a memory of the information processing apparatus prior to a time of shipment of the information processing apparatus;
    identify a cause of an abnormality in the image reading apparatus, in response to detecting the abnormality, based on the first spectral reflectance and the second spectral reflectance; and
    determine the cause of the abnormality as a deterioration of the reference white plate in response to a large difference in distribution between the first spectral reflectance and the second spectral reflectance being confined to a particular wavelength range.

2. The information processing apparatus according to claim 1,
    wherein the processing circuitry is further configured to detect the abnormality in the image reading apparatus by using at least one of
        a difference between the first spectral reflectance and the second spectral reflectance,
        a ratio between the first spectral reflectance and the second spectral reflectance, or
        a degree of similarity between the first spectral reflectance and the second spectral reflectance based on statistics.

3. The information processing apparatus according to claim 1,
    wherein the processing circuitry is further configured to set a wavelength band of each of the first spectral reflectance and the second spectral reflectance to be used for abnormality detection to 400 nm to 700 nm.

4. The information processing apparatus according to claim 1,
    wherein the processing circuitry is further configured to identify the cause of the abnormality in the image reading apparatus based on the first spectral reflectance and the second spectral reflectance in a specific wavelength range.

5. The information processing apparatus according to claim 1,
    wherein the processing circuitry is further configured to identify the cause of the abnormality in the image reading apparatus by using sensor information obtained in a direction orthogonal to an array direction of the one line sensor installed in the image reading apparatus.

6. The information processing apparatus according to claim 1,
    wherein the processing circuitry is further configured to notify a user of the cause of the abnormality in the image reading apparatus and a countermeasure to the cause.

7. The information processing apparatus according to claim 6,
    wherein the processing circuitry is further configured to automatically correct a setting value in the image reading apparatus in response to the setting value being incorrect.

8. An information processing system comprising:
    an image reading apparatus configured to read a reference white plate; and
    the information processing apparatus according to claim 1.

9. The information processing apparatus according to claim 1, wherein the second spectral reflectance is reference spectral reflectance data on the reference white plate at the time of shipment.

10. The information processing apparatus according to claim 1, wherein the processing circuitry is further configured to:
    determine the cause of the abnormality based on a distribution of the first spectral reflectance and a distribution of the second spectral reflectance.

11. The information processing apparatus of claim 1, wherein the processing circuitry is further configured to:
    determine the cause of the abnormality to be at least one of an abnormality of a scanner lens or the line sensor in response to a difference between a distribution over an entire wavelength range of the first spectral reflectance and a distribution over an entire wavelength range of the second spectral reflectance.

12. The information processing apparatus according to claim 1, wherein the processing circuitry is further configured to:
    generate first spectral reflectance based on the data read by the one line sensor and a transformation matrix.

13. The information processing apparatus according to claim 12, wherein the transformation matrix is based on learning data including signal values associated with spectral reflectances.

14. An abnormality detection method to be executed in an information processing apparatus, the abnormality detection method comprising:
  detecting an abnormality in an image reading apparatus from a first spectral reflectance and a second spectral reflectance, the first spectral reflectance being generated based on data read, by one line sensor, from a reference white plate installed in the image reading apparatus, the second spectral reflectance being stored in a memory of the information processing apparatus prior to a time of shipment of the information processing apparatus;
  identifying a cause of an abnormality in the image reading apparatus, in response to detecting the abnormality, based on the first spectral reflectance and the second spectral reflectance; and
  determining the cause of the abnormality as a deterioration of the reference white plate in response to a large difference in distribution between the first spectral reflectance and the second spectral reflectance being confined to a particular wavelength range.

15. The abnormality detection method according to claim 14, wherein the second spectral reflectance is reference spectral reflectance data on the reference white plate at the time of shipment.

16. A non-transitory storage medium storing computer-readable code which, when executed by one or more processors, cause an information processing apparatus to perform a method comprising:
  detecting an abnormality in an image reading apparatus from a first spectral reflectance and a second spectral reflectance, the first spectral reflectance being generated based on data read, by one line sensor, from a reference white plate installed in the image reading apparatus, the second spectral reflectance being stored in a memory of the information processing apparatus prior to a time of shipment of the information processing apparatus;
  identifying a cause of an abnormality in the image reading apparatus in response to detecting the abnormality, based on the first spectral reflectance and the second spectral reflectance; and
  determining the cause of the abnormality as a deterioration of the reference white plate in response to a large difference in distribution between the first spectral reflectance and the second spectral reflectance being confined to a particular wavelength range.

17. The non-transitory storage medium according to claim 16, wherein the second spectral reflectance is reference spectral reflectance data on the reference white plate at the time of shipment.

* * * * *